United States Patent [19]
Pommier et al.

[11] Patent Number: 6,068,046
[45] Date of Patent: May 30, 2000

[54] HEATING/VENTILATION AND/OR AIR CONDITIONING INSTALLATION FOR THE PASSENGER COMPARTMENT OF A VEHICLE

[75] Inventors: Didier Pommier, Maintenon; Charles Urset, Eragny-sur Oise; Michel Salmon, Mery-sur-Oise, all of France

[73] Assignee: Valeo Climatisation, France

[21] Appl. No.: 08/553,385

[22] PCT Filed: Mar. 24, 1995

[86] PCT No.: PCT/FR95/00373

§ 371 Date: Nov. 22, 1995

§ 102(e) Date: Nov. 22, 1995

[30] Foreign Application Priority Data

Mar. 24, 1994 [FR] France .................................. 94-03494

[51] Int. Cl.[7] .............................. F25B 29/00; B60H 1/24
[52] U.S. Cl. .................. 165/42; 165/41; 165/43; 62/244; 62/448; 454/121; 237/12.3 A; 296/205; 296/208
[58] Field of Search ............................. 62/448, 449, 450, 62/244, 243; 165/42, 43, 41; 454/121, 127; 296/208, 205; 237/12.3 A, 12.3 B

[56] References Cited

U.S. PATENT DOCUMENTS

| | | | |
|---|---|---|---|
| 2,185,033 | 12/1939 | Melcher | 62/302 |
| 2,185,034 | 12/1939 | Melcher | 62/448 |
| 2,347,141 | 4/1944 | Werdehoff | 454/120 |
| 2,525,869 | 10/1950 | Corhandis | 62/448 |
| 2,664,308 | 12/1953 | Appel . | |
| 2,696,774 | 12/1954 | Bayley . | |
| 2,713,777 | 7/1955 | Mansmann | 62/448 |
| 2,722,106 | 11/1955 | Henney . | |
| 2,774,227 | 12/1956 | Schjolin et al. | 62/243 |
| 2,804,756 | 9/1957 | Faulhaber et al. | 62/448 |
| 2,902,837 | 9/1959 | Willis et al. | 62/448 |
| 2,922,290 | 1/1960 | Carraway | 62/244 |
| 3,218,820 | 11/1965 | Spatt . | |
| 3,218,821 | 11/1965 | Spatt . | |
| 3,278,121 | 10/1966 | Komenda | 454/127 |
| 3,451,469 | 6/1969 | Hall et al. | 454/121 |
| 3,455,595 | 7/1969 | Wessells III, et al. . | |
| 3,862,549 | 1/1975 | Fernandes | 165/42 |
| 3,906,740 | 9/1975 | Thomas | 62/244 |
| 3,996,762 | 12/1976 | Calme et al. . | |
| 4,201,064 | 5/1980 | Krug et al. | 62/244 |
| 4,732,011 | 3/1988 | Haiya | 62/244 |
| 4,747,636 | 5/1988 | Harasaki et al. | 296/208 |
| 4,945,977 | 8/1990 | D'Agaro | 165/43 |
| 5,054,378 | 10/1991 | Speece | 62/244 |
| 5,222,372 | 6/1993 | DeRees et al. . | |

FOREIGN PATENT DOCUMENTS

| | | |
|---|---|---|
| 0 563 807 A1 | 3/1993 | European Pat. Off. . |
| 61-0143211 | 6/1986 | Japan ................ 237/12.3 A |
| 4-166412 | 6/1992 | Japan ........................ 165/42 |

*Primary Examiner*—John K. Ford
*Attorney, Agent, or Firm*—Morgan & Finnegan, LLP

[57] ABSTRACT

The invention concerns a heating/air conditioning installation for the passenger compartment of a vehicle.

It comprises treatment means produced in the form of at least one removable box suitable for being installed underneath the floor of the vehicle and containing an air inlet, an optional evaporator, a heating radiator and at least one air outlet suitable for being connected to distribution vents distributed within the passenger compartment.

9 Claims, 2 Drawing Sheets

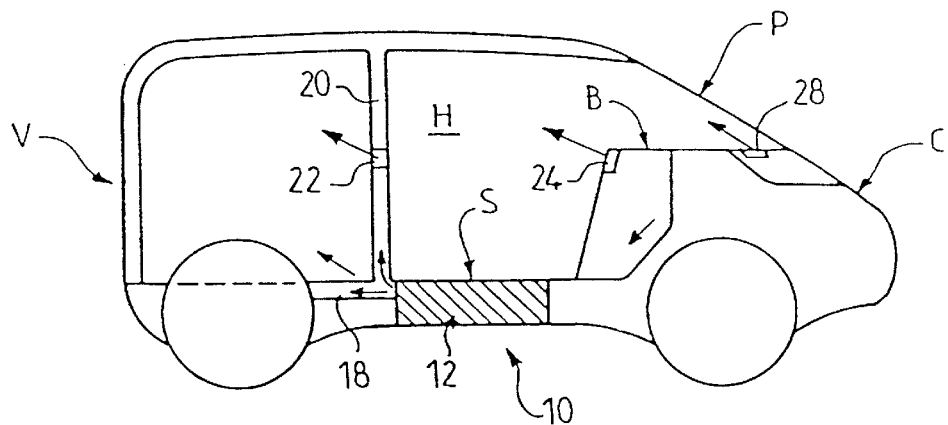
FIG.1
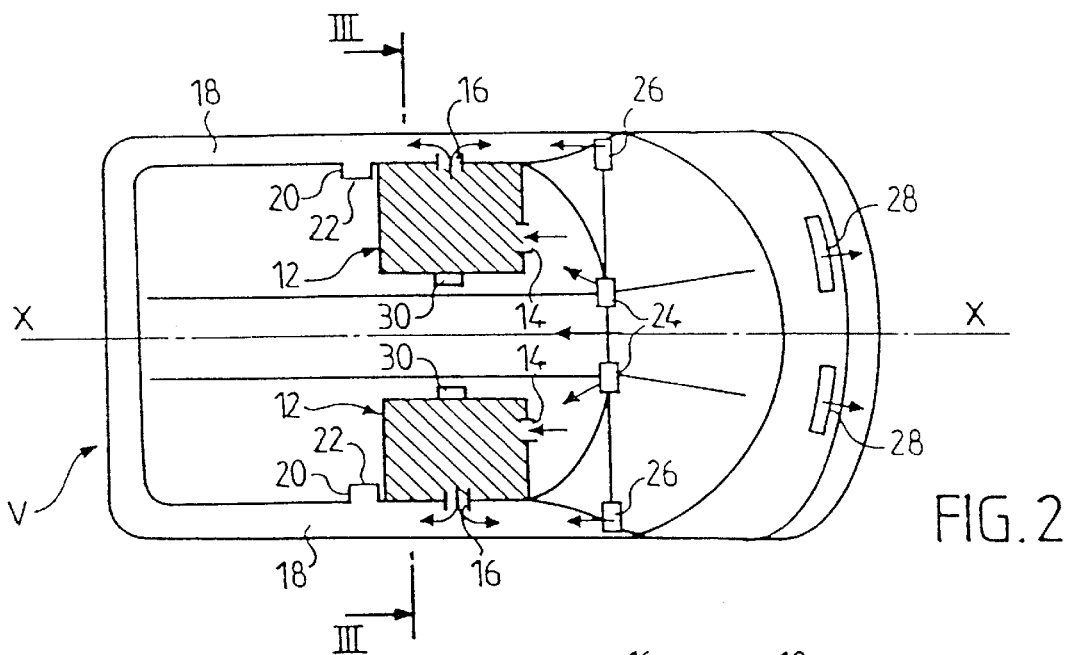
FIG.2
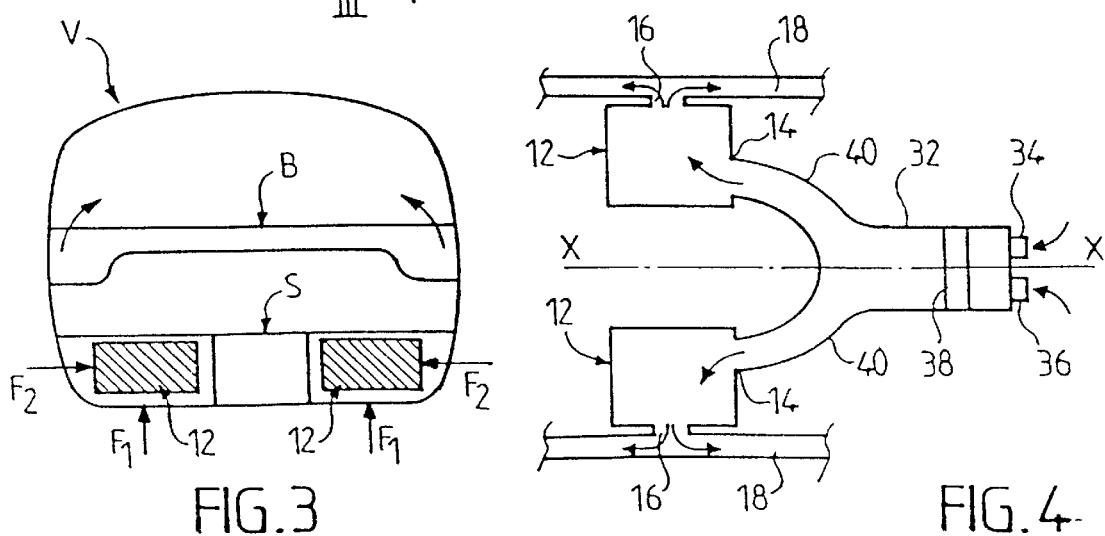
FIG.3
FIG.4

HEATING/VENTILATION AND/OR AIR CONDITIONING INSTALLATION FOR THE PASSENGER COMPARTMENT OF A VEHICLE

The invention concerns a heating/ventilation and/or air conditioning installation for the passenger compartment of a vehicle, in particular of the "multipurpose vehicle" or "minivan" type.

Known installations of this type comprise treatment means suitable for producing treated air—hot or conditioned—and pipes connecting the treatment means to distribution vents distributed within the passenger compartment.

In a known manner, these treatment means comprise an air inlet suitable for being supplied with air from the outside or recycled air, a fan suitable for sending this air through a radiator, and one or more outlets connected to the distribution pipes.

Most often, these treatment means also comprise an evaporator forming part of an air conditioning circuit, this evaporator being positioned between the fan and the heating radiator.

In known installations, these treatment means are disposed either beneath the fascia inside the passenger compartment or partially within the engine compartment.

For vehicles in which the volume of the passenger compartment is large, as is often the case with those of the "multipurpose vehicle" or "minivan" type, additional air treatment means may be provided, positioned at the rear of the vehicle, either in the boot or under the roof.

A principal drawback with these known installations lies in the fact that the treatment means occupy a not inconsiderable space, whether beneath the fascia or in the engine compartment.

Furthermore, these known installations have the drawback that the treatment means are difficult to access, which increases the time and cost of repairs when work is necessary.

The main aims of the invention are to overcome the aforementioned drawbacks.

To this end, it proposes a heating/ventilation and/or air conditioning installation of the type defined in the introduction, in which the treatment means comprise at least one removable box suitable for being installed under the floor of the vehicle and containing an air inlet, a heating radiator, an optional evaporator and at least one air outlet.

As a result, the invention makes it possible to free the space conventionally used by the treatment means, whether beneath the fascia or partially inside the engine compartment, and to make this space available for other functions.

The invention also has the advantage of bringing together all the treatment means in at least one removable box, which can be supplied to the manufacturer ready for use.

As a result, fitting to the vehicle is easy and rapid.

Furthermore, when any work is done, it is easy to remove the box in order to repair it and to refit it, or optionally replace it with another box.

The removable box can be mounted either from under the floor or from the side in the manner of a drawer. In all cases, the box has rapid fixing means for facilitating mounting and removal.

In a preferential embodiment, the installation comprises two removable boxes disposed respectively on the right-hand side and left-hand side of the vehicle and sending treated air respectively into the right-hand part and left-hand part of the passenger compartment.

In this case, the two boxes are advantageously placed in symmetrical positions on each side of the longitudinal axis of the vehicle.

This facilitates the connection of each of the boxes to the air distribution pipes.

Advantageously, the respective air inlets of the two boxes are connected to a common admission pipe suitable for being fed with air from the outside or recycled air.

This common admission pipe can, if necessary, house a filter.

When the air treatment means comprise an evaporator, the latter forms part of a conventional refrigeration circuit also including a compressor, a condenser and a pressure reducer.

Advantageously, this refrigeration circuit is also housed in the box.

In a variant, it is possible for the components of the circuit to be external to the box, rapid connection means then being provided in order to connect the evaporator to the other components of the refrigeration circuit.

In order to facilitate the mounting and removal of the box or each box, the air inlet of the box is provided with a rapid coupling to connect it to an air admission pipe and the air outlet(s) of the box is (are) each provided with a rapid coupling for its (their) connection to the distribution pipes.

These rapid couplings facilitate the mounting and removal of the box and, at the same time, reduce the mounting or removal time.

In a preferred embodiment of the invention, the distribution pipes of the installation are formed at least partially by hollow elements of the frame of the vehicle, which notably comprise hollow side members.

In a preferred embodiment of the invention in which the air treatment means comprise two removable boxes, each of the boxes can be situated in the immediate vicinity of a hollow side member disposed level with the floor.

Provision can thus be made for the box or each box to have a single air outlet connected to a hollow side member of the frame.

In another variant, the box or each box of the air treatment means comprises two air outlets, one connected to a hollow side member of the frame, the other connected to a pipe connected to distribution vents located on the fascia.

In the description that follows, given solely by way of example, reference will be made to the accompanying drawings, in which:

FIG. 1 is a diagrammatic view in vertical and longitudinal section of a vehicle equipped with an installation according to the invention;

FIG. 2 is a diagrammatic depiction in plan view of the vehicle in FIG. 1;

FIG. 3 is a diagrammatic view in section along the line III—III in FIG. 2;

FIG. 4 is a partial diagrammatic view of the air treatment means and of part of the distribution pipes of the installation equipping the vehicle in FIGS. 1 to 3;

Figures 5, 6:
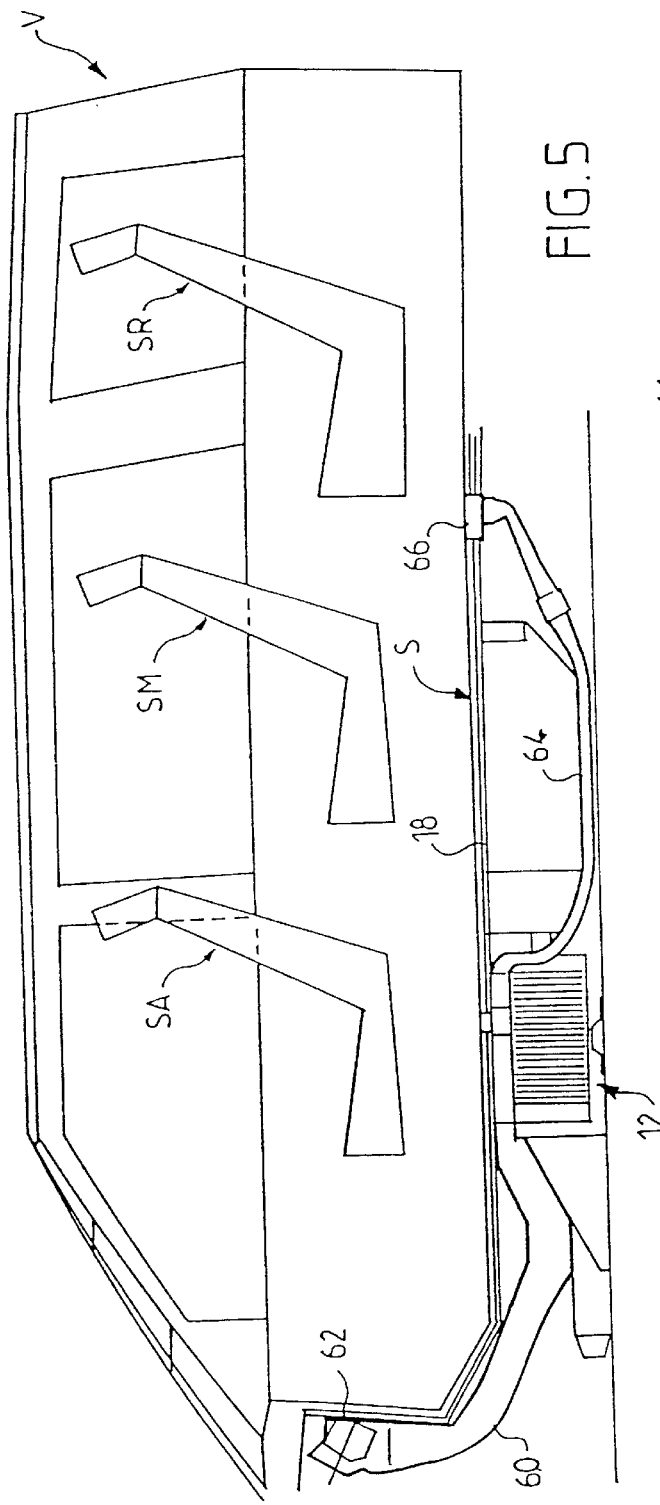
FIG. 5 is a view in partial longitudinal section of another vehicle equipped with an installation according to the invention in a variant embodiment.
FIG. 6 is a partial plan view of part of the treatment means of the installation of the device of the vehicle in FIG. 5.

Reference will first of all be made to FIGS. 1 to 3, which depict a vehicle V, of the "multipurpose vehicle" or "minivan" type comprising a passenger compartment H with a large volume. The vehicle V has a windscreen P situated substantially in line with the engine bonnet C, and a large fascia B.

The vehicle V is equipped with a heating/air conditioning installation designated as a whole by the reference numeral 10.

The installation 10 comprises two removable boxes 12 suitable for being installed under the floor S of the vehicle V, respectively on the right-hand side and left-hand side of the vehicle in two positions symmetrical with respect to its median longitudinal axis XX (FIG. 2).

The two boxes 12 contain treatment means suitable for producing hot or conditioned air, which will be described below. The boxes 12 are designed to send hot or conditioned air respectively into the right-hand and left-hand part of the passenger compartment H.

The boxes 12 comprise two respective air inlets 14 (FIG. 2 and FIG. 4) each suitable for being fed with air from the outside or recycled air coming from the passenger compartment H.

Moreover, the boxes 12 comprise respective air outlets 16 suitable for sending hot or conditioned air into distribution pipes leading to distribution vents.

In the example depicted, the air outlets 16 open out respectively into two hollow side members 18 which form part of the frame of the vehicle. The hollow side members 18 communicate respectively with two hollow uprights 20 (FIG. 2) on which there are mounted respectively two distribution vents 22 suitable for sending air into the passenger compartment.

The side members 18 also enable treated air to be channelled to two vents 24 positioned in the central area of the fascia B, to two vents 26 provided laterally on the fascia B and to two distribution vents 28 provided near the windscreen for the purpose of de-misting and de-icing.

As can be seen in FIG. 3, the two boxes 12 can be installed either from below by a vertical movement in the direction of the arrows F12, or from the side in the manner of a drawer by horizontal movement in the direction of the arrows F2.

The boxes 12 each comprise rapid fixing means 30 depicted diagrammatically in FIG. 2.

As can be seen in FIG. 4, the inlets 14 of the boxes 12 are connected to a common admission pipe 32 suitable for being fed with air from the outside by an inlet 34 or with recycled air by an inlet 36. The common admission pipe 32 is provided with an internal filter 38 and divides into two pipes 40 which are connected respectively to the two inlets 14.

In the embodiment in FIGS. 5 and 6, to which reference is now made, the vehicle V, also of the "multipurpose vehicle" or "minivan" type, is also provided with two boxes disposed symmetrically on each side of the median longitudinal axis XX.

In the example, the vehicle V has three rows of seats: front seats SA, middle seats SM and rear seats SR. The two boxes 12 are installed under the floor S in the region of the front seats SA.

The air inlet 14 of the box 12 (FIG. 6) is connected to the air admission pipe 40 by a rapid coupling 42. The air inlet 14 feeds a fan 44 whose outlet is connected to a box 46 containing an evaporator 48 and a heating radiator 50. The air sent by the fan 44 thus passes successively through the evaporator 48 and the heating radiator 50. It is thereafter divided between two outlet pipes 52 and 54, provided respectively with two rapid couplings 56 and 58. The pipe 52 can be connected, by the rapid coupling 56, to a pipe 60 leading to distribution vents 62 positioned on the fascia.

The pipe 54 can be connected, by a rapid coupling 58, to a pipe 64 whose outlet 66 opens out into the adjacent side member 18.

The side member 18 can feed various distribution vents situated, for example, on hollow uprights communicating with the side member 18 or on vents situated at floor level and communicating with the hollow upright through cross members (not shown).

Thus, in the embodiment in FIGS. 5 and 6, the installation 10 also comprises two boxes 12 containing air treatment means for sending treated air respectively into the right-hand part and into the left-hand part of the passenger compartment.

The evaporator 48 is connected to a refrigeration circuit 68 of conventional structure, which is also contained in the box 12. This circuit 68 comprises a compressor 70, a condenser 72 and a pressure reducer 74. The evaporator 48 is interposed between the pressure reducer 74 and the compressor 70.

In a variant (not shown), it would be possible to have a refrigerating circuit common to the two boxes 12 and situated externally thereto. In this case, the refrigerating circuit could be connected to the two boxes 12 by suitable rapid couplings.

The radiator 50 is connected to two tubes 76, 78 serving respectively to bring or evacuate a heat transfer fluid, for example the cooling fluid of the vehicle engine. The two tubes 76 and 78 are connected to a common rapid coupling.

As a variant, it would be possible to replace the radiator 50 with an electric radiator.

The installation of the invention thus releases the space traditionally occupied beneath the fascia or in the engine compartment by conventional treatment means.

The installation of the invention facilitates the distribution of air by virtue of the fact that the treatment means are situated more centrally in the vehicle and that it is moreover possible to use the hollow structures of the vehicle to distribute air to the distribution vents.

Furthermore, by disposing the components of the refrigeration circuits in the box or in each box, space is released in the engine compartment.

In general terms, the use of one or more boxes makes it possible to supply a compact assembly to the manufacturer, who needs simply to mount the boxes in the vehicles on the assembly lines.

The positioning of the box on the structure of the vehicle is easier, and it can be fixed rapidly, notably because of the use of rapid couplings.

Not only is mounting on the vehicle easier and more rapid, but maintenance is also facilitated thereby.

It should also be noted that the comfort of the user of the vehicle is enhanced, by means of improved apportionment of the distributed air and better damping of noises by virtue of the fact that the air treatment means are positioned under the floor.

What is claimed is:

1. A main heating/air conditioning installation for the passenger compartment of a vehicle, comprising treatment means for producing treated air and distribution pipes connected to the treatment means in order to channel the treated air to distribution vents distributed within the passenger compartment, wherein the treatment means comprise at least one removable box capable of being removed from the vehicle for being installed under the floor of the vehicle, the removable box comprising a heating radiator, an air inlet and at least two air outlets, one of said air outlets being connected to a pipe leading to distribution vents positioned on a fascia and another of said air outlets leading to a pipe connected to a hollow side member, and wherein the distribution pipes are formed at least partially by hollow elements of the frame of the vehicle, which comprises the side member.

2. Installation according to claim 1, wherein the at least one removable box is mounted vertically from underneath the floor and further including a rapid fixing means.

3. Installation according to one of claims 1 and 2, comprising two removable boxes disposed respectively on the right-hand side and left-hand side of the vehicle and sending treated air respectively in the right-hand part and left-hand part of the passenger compartment.

4. Installation according to claim 3, wherein the respective air inlets of the two removable boxes are connected to a common admission pipe suitable for being supplied with air from the outside.

5. Installation according to claim 1, wherein an evaporator in the box is connected to a refrigeration circuit also housed in the box.

6. Installation according to claim 1, wherein the air inlet of the box is provided with a rapid coupling for being connected to an air admission pipe and wherein the air outlets are each provided with a rapid coupling for being connected to the distribution pipes.

7. Installation according to claim 1, wherein the at least one removable box is mounted horizontally from the side in the manner of a drawer and further including a rapid fixing means.

8. Installation according to claim 3, wherein the respective air inlets of the two removable boxes are connected to a common admission pipe for being supplied with recycled air.

9. A heating/air conditioning installation for the passenger compartment of a vehicle, comprising treatment means for producing treated air and distribution pipes connected to the treatment means in order to channel the treated air to distribution vents distributed within the passenger compartment, wherein the treatment means comprise at least one removable box capable of being removed from the vehicle for being installed under the floor of the vehicle and containing an air inlet, a heating radiator and at least two air outlets, one of said air outlets being connected to a hollow side member of the frame of the vehicle and another of said air outlets being connected to the distribution vents on a fascia, and wherein the distribution pipes are formed at least partially by hollow elements of the frame of the vehicle.

* * * * *